(12) United States Patent
Stubbs

(10) Patent No.: US 6,493,174 B1
(45) Date of Patent: Dec. 10, 2002

(54) OPTICAL SERVO SYSTEM FOR USE WITH MAGNETIC DATA STORAGE TAPE HAVING MAGNETIC REFERENCE INDICATORS

(75) Inventor: Daniel P. Stubbs, Marine on St. Croix, MN (US)

(73) Assignee: Imation Corp., Oakdale, MN (US)

(*) Notice: Subject to any disclaimer, the term of this patent is extended or adjusted under 35 U.S.C. 154(b) by 0 days.

(21) Appl. No.: 09/506,174

(22) Filed: Feb. 17, 2000

(51) Int. Cl.⁷ .............................................. G11B 5/584
(52) U.S. Cl. ................................................... 360/77.12
(58) Field of Search ................................ 360/77.12, 75, 360/77.03, 78.02, 78.11; 369/44.11, 44.25

(56) References Cited

U.S. PATENT DOCUMENTS

| | | | |
|---|---|---|---|
| 4,558,383 A | | 12/1985 | Johnson |
| 4,816,939 A | * | 3/1989 | Ford et al. ............... 360/77.03 |
| 4,935,835 A | | 6/1990 | Godwin et al. |
| 4,958,245 A | | 9/1990 | Roth et al. |
| 4,961,123 A | | 10/1990 | Williams et al. ..... 360/77.03 X |
| 5,065,387 A | | 11/1991 | Roth et al. |
| 5,535,069 A | | 7/1996 | Chiao et al. ............. 360/77.03 |
| 5,563,864 A | | 10/1996 | Kobayashi et al. |
| 5,563,868 A | | 10/1996 | Farnsworth et al. |
| 5,689,384 A | | 11/1997 | Albrecht et al. |
| 6,075,678 A | * | 6/2000 | Saliba ......................... 360/291 |
| 6,188,532 B1 | * | 2/2001 | Albrecht et al. ..... 360/77.12 X |
| 6,236,529 B1 | * | 5/2001 | Leonhardt et al. ....... 360/77.12 |
| 6,246,535 B1 | * | 6/2001 | Saliba et al. ............ 360/77.12 |
| 6,267,313 B1 | * | 7/2001 | Saliba et al. ................ 242/345 |
| 6,433,951 B1 | * | 8/2002 | Lubratt .................... 360/77.12 |
| 6,433,952 B1 | * | 8/2002 | Kaaden et al. .......... 360/77.12 |

FOREIGN PATENT DOCUMENTS

JP 11-96705 4/1999

OTHER PUBLICATIONS

"LS–120 SuperDisk™ Primer," Dan Stubbs, Jan. 28, 1998, Imation Corp., pp. 1–22.

* cited by examiner

*Primary Examiner*—David Hudspeth
*Assistant Examiner*—James L. Habermehl
(74) *Attorney, Agent, or Firm*—Eric D. Levinson

(57) ABSTRACT

Optical servo systems and magnetic data storage tape for use with magnetic data storage drives. The servo system utilizes a head mechanism that includes an optical head and a magnetic head. The optical head is adapted to detect a series of optical indicator marks located on a servo track on the tape. The magnetic head is adapted to detect one or a series of magnetic reference indicator marks located on a corresponding data track. The magnetic reference indicator marks are, in one embodiment, spaced periodically along the length of the tape. The magnetic reference indicator marks allow recalibration of the optical servo system by permitting the determination of any dimensional offset between the optical head and the magnetic head attributable to manufacturing tolerances or environmental factors. In one embodiment, a separate temperature sensor may be used to determine thermal changes in and around the head mechanism. Based on the temperature change measured, a special calibration algorithm may be invoked to recalibrate the distance between the optical head and the magnetic head.

22 Claims, 1 Drawing Sheet

OPTICAL SERVO SYSTEM FOR USE WITH MAGNETIC DATA STORAGE TAPE HAVING MAGNETIC REFERENCE INDICATORS

TECHNICAL FIELD

The present invention relates to magnetic data storage tape systems. More particularly, the present invention pertains to methods and systems for positioning read/write heads on magnetic data storage tape using magnetic reference indicator marks in connection with optical servo positioning.

BACKGROUND

Magnetic data storage systems (e.g., disk, tape) which utilize media having magnetic servo tracks are generally known in the art. These systems utilize a magnetic pattern having a fixed relationship to one or more data tracks to servo position a transducing or read/write head over the data track(s). An example of this sort of system is described in U.S. Pat. No. 5,689,384 to Albrecht et al., issued Nov. 18, 1997.

Optical servo systems utilizing optical servo tracks provide an alternative to magnetic servo systems. Optical servo systems utilize a series of optical features located relative to the data storage tracks to servo position a magnetic read/write head over the desired data track. Optical servo systems are advantageous over magnetic servo systems in that they can potentially free-up a greater portion of the media surface for magnetic data recording. Examples of optical servo systems can be found in U.S. Pat. Nos. 4,958,245 issued to Roth et al., and 5,563,864 issued to Kobayashi et al.

Some disk drive systems utilize a magnetic reference on the disk to adjust the position of an optically-servoed read/write head. For example, see U.S. Pat. No. 4,935,835 to Godwin et al. However, these systems are directed to disk drives.

SUMMARY OF THE INVENTION

To provide an optical servo system for use with data storage tape that overcomes these problems, optical servo systems are provided where the tape includes magnetic reference indicator marks. In one embodiment, a method of positioning a magnetic read/write head on a magnetic data storage tape is provided. The method includes a magnetic data storage tape having at least one magnetic data storage track extending along a length of the tape, at least one optical servo pattern distributed along the length of the tape, and at least one magnetic reference indicator mark located along the magnetic data storage track. A head mechanism is also provided where the head mechanism has a magnetic head and an optical head. The method includes moving the magnetic data storage tape relative to the head mechanism in a transducing direction and positioning the magnetic head in a translating direction over a selected magnetic data storage track by detecting a selected optical servo pattern with the optical head. The method further includes detecting a first magnetic reference indicator mark and adjusting the position of the magnetic head over the selected magnetic data storage track based on the first magnetic reference indicator mark.

In another embodiment, a magnetic data storage tape is provided. The tape includes at least one magnetic data storage track extending along a length of the tape, at least one optical servo pattern distributed along the length of the tape; and at least one magnetic reference indicator mark located along the magnetic data storage track.

In still another embodiment, an information handling system is provided having a tape drive with an optical servo system. The optical servo system includes a head mechanism having a magnetic head and an optical head wherein the optical head is adapted to maintain the position of the magnetic head over a data track on a magnetic tape as the magnetic tape moves relative thereto. The magnetic head is adapted to calibrate the head mechanism by reading one or more magnetic reference indicator marks located along the tape. The system also includes an information processing device operatively coupled to the tape drive.

Advantageously, the present invention provides an optical servo system for use with a magnetic tape drive wherein the optical servo system may be recalibrated to correct for dimensional fluctuations of the tape drive components to maintain consistent, accurate positioning of the read/write heads relative to the tape.

DETAILED DESCRIPTION OF THE EXEMPLARY EMBODIMENTS

Figure 1:
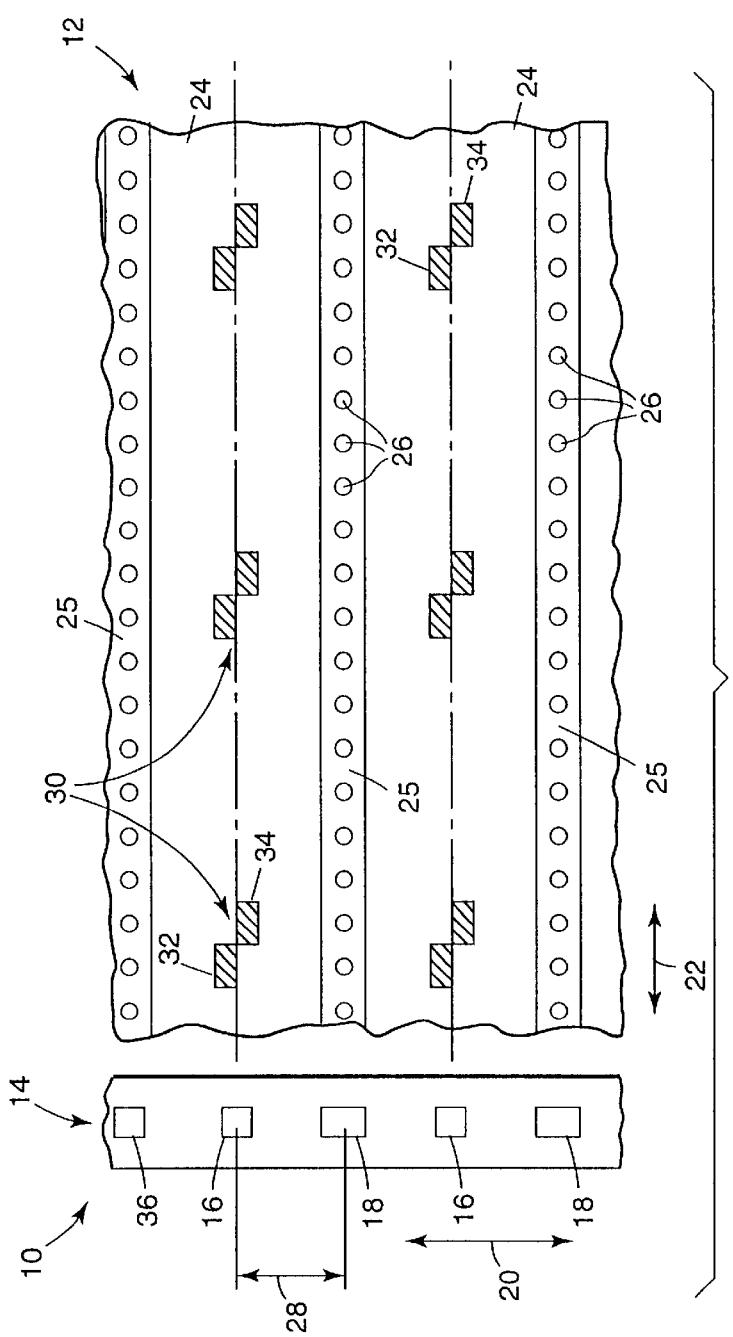
FIG. 1 is a diagrammatic view of an optical servo system utilizing magnetic reference tracks in accordance with one embodiment of the invention.

FIG. 1 diagrammatically illustrates an optical servo system 10. While not a part of the servo system itself, a data storage tape 12 works in conjunction with the system 10 as illustrated and described herein. The system 10 includes a head mechanism 14 having one or more magnetic read/write heads 16 and one or more servoing, optical heads 18. The head mechanism 14 can move laterally across the tape 12 in a translating direction 20 while the tape 12 moves in a travelling or transducing direction 22.

The tape 12 includes at least one data storage track 24 in which magnetically encoded data is read or written on the tape 12 by the magnetic head 16. To servo position the magnetic head 16 directly over the desired data track 24, a servo track 25 located on the tape surface works in conjunction with the optical head 18. The optical head 18 determines the position of the mechanism 14 by detecting a repeating pattern of optical marks or stitches 26 which are formed by surface ablation or other means in the center of the servo track 25.

In one embodiment, the optical head 18 is configured as a laser focused on the tape surface. Laser energy reflected from the tape surface is then directed to one or more photodetectors (not shown). The intensity of the reflected light is altered when the laser is incident on the stitches 26. As the tape 12 moves in the transducing direction 22, the stitches 26 pass through the laser and alter the light reflected to the photodetector. A signal is then generated by the photodetector where the signal oscillates with an amplitude determined by the relative track position (e.g., maximum when the stitches are precisely aligned with the optical head and decreasing in proportion to the offset of the stitch from the optical head). Accordingly, the optical heads 18 are able to detect the position of the apparatus 14 in the translating direction 20 relative to the tape 12. By suitably arranging the laser and photodetector, the optical head 18 may also be used to lock on an arbitrary position in the translating direction (see e.g., Roth et al., and Kobayashi et al.).

Also within the scope of the invention are time-based rather than amplitude-based systems. For example, while illustrated as circular, the stitches 26 may be configured to form a pattern similar to the chevron-shaped pattern described in Albrecht et al. Alternatively, the system may be configured as generally described in U.S. patent application No. 09/506,470, entitled "Time-Based Optical Servo System and Method," (filed Feb. 17, 2000 bunder attorney reference no. 10159US01).

While the embodiment illustrated in FIG. 1 shows a separate servo track 25 corresponding to each data track 24, other embodiments are also possible. For instance, a single servo track 25 could be used with multiple data tracks 24. Alternatively, the servo stitches 26 could be embedded into the data tracks 24 themselves (in the guard bands, for example) so that they do no reduce the area available for recording. In yet another embodiment, the servo track(s) 25 may be located on an opposite side of the tape 12 from the data tracks 24.

To accurately position the magnetic head 16 based upon the location of the optical head 18, the distance 28 between the heads 16 and 18 is pre-determined. Thus, the position of the optical head 18 corresponds to a particular position of the magnetic head 16. Unfortunately, various factors affect the distance 28. For instance, dimensional fluctuations due to manufacturing and machining tolerances of the mechanism 14 can result in variation in the distance 28 from one system to another. In addition, expansion and contraction of the various components caused by temperature, humidity or other environmental factors may dynamically alter the distance 28 during operation.

To compensate for these variations, the servo system of the present invention is further configured to read one or more magnetic reference indicator marks 30 on the tape 12. In one embodiment, a series of indicator marks 30 are located along the data track 24 where each mark 30 is readable by a magnetic head which preferably is the same head 16 used to read/write data on the track 24. However, embodiments where a separate magnetic head is provided for reading the reference marks 30 is also within the scope of the invention. Generally speaking, the magnetic indicator marks 30 are read by the magnetic head 16 to periodically recalibrate the distance 28, compensating for any dimensional variation. This ensures that data is consistently and accurately read/written on the tape 12.

While other embodiments of the indicator marks 30 are possible, in one embodiment, they are formed about a centerline of the data track 24. As FIG. 1 indicates, each mark 30 includes a first portion 32 substantially formed on a first side of the track centerline and a second portion 34 substantially formed on a second side of the track centerline. The portion 32 forms an "A" burst while the second portion 34 forms a "B" burst. As stated above, the marks 30 are preferably repeated periodically along the length of the tape 12 to provide the desired recalibration frequency.

During a data read or data write operation, the apparatus 14 is positioned in the translating direction 20 so that the magnetic head 16 is located over the desired data track 24. The optical head 18 controls the position of the mechanism 14 relative to the tape 20 by monitoring the position of the stitches 26 as the tape moves in the transducing direction 22. The spacing of the stitches 26 is pre-determined to provide adequate position feedback during operation. Accordingly, the optical head 18 accurately positions the magnetic head 16 relative to the data track 24.

To account for dimensional variation between the optical and magnetic heads 16, 18 as well as between the centerline of the servo track 25 and the centerline of the magnetic data track 24, the magnetic reference indicator marks 30 are used to periodically recalibrate the system. In the particular embodiment illustrated in FIG. 1, the optical head 18 is used to position the mechanism 14 as generally described above. The magnetic head 16 is then used to detect the portions 32 and 34 of the indicator marks 30 as they move by the mechanism 14 in the transducing direction 22. The configuration of the A/B bursts permits an accurate determination of the offset between the centerline of the magnetic head 16 and the centerline of the data track 24. Based on this information, a correction signal is generated and used to recalibrate the optical servo system. That is, the correction signal is used to offset the position determined by the optical head 18, thus ensuring that the read/write head 16 remains centered over the data track 24. If the A/B bursts are suitably distributed along the length of the tape, a continuously renewing calibration can be executed during normal read and write operation.

In another embodiment of the invention, a temperature sensor 36 may be included which monitors the temperature of the tape drive. As the temperature varies and the distance 28 changes, the sensor 36 will trigger a recalibration algorithm, correcting the thermally induced error.

Figure 2:
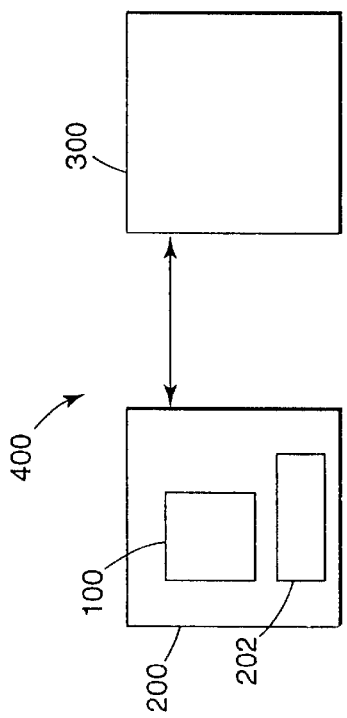
FIG. 2 is a diagrammatic view of a data storage system in accordance with one embodiment of the invention.

FIG. 2 illustrates an information handling system 400 incorporating a tape drive 200 having an optical servo system 100 in accordance with one embodiment of the invention. The tape drive is used to read and write information on a tape 202. The tape drive 200 is operatively coupled to an information processing device 300 such as, for example, a computer or network of computers.

Advantageously, the present invention provides an optical servo system for use with a magnetic tape drive wherein the optical servo system may be recalibrated to correct for dimensional fluctuations of the tape drive components to maintain consistent, accurate positioning of the read/write heads relative to the tape.

What is claimed is:

1. A method of positioning a magnetic read/write head on a magnetic data storage tape comprising:

providing a magnetic data storage tape comprising at least one magnetic data storage track extending along a length of the tape, at least one optical servo pattern distributed along the length of the tape, and at least one magnetic reference indicator mark located along the magnetic data storage track;

providing a head mechanism comprising a magnetic head and an optical head;

moving the magnetic data storage tape relative to the head mechanism in a transducing direction;

positioning the magnetic head in a translating direction over a selected magnetic data storage track by detecting a selected optical servo pattern with the optical head;

detecting a first magnetic reference indicator mark; and adjusting the position of the magnetic head over the selected magnetic data storage track based on the first magnetic reference indicator mark.

2. The method of claim 1, further comprising:

maintaining the position of the magnetic head over the selected magnetic data storage track after detecting the first magnetic reference indicator mark using the selected optical servo pattern as detected by the optical head;

detecting a second magnetic reference indicator mark located along the selected magnetic data storage track after detecting the first magnetic reference indicator mark; and readjusting the position of the magnetic head over the selected magnetic data storage track based on the second magnetic reference indicator mark.

3. The method of claim 1, wherein the magnetic data storage track has a first and second end, and further wherein at least one of the magnetic reference indicator marks is located proximate the first and second end of the magnetic data storage track.

4. The method of claim 1, wherein the magnetic data storage track has a first and second end, and further wherein at least one of the magnetic reference indicator marks is located proximate the first and second end of the magnetic data storage track, and still further wherein at least one of the magnetic reference indicator marks is located between the first and second ends of the magnetic data storage track.

5. The method of claim 1, wherein the optical servo pattern is distributed substantially continuously along the length of the tape.

6. The method of claim 2, further comprising detecting the selected optical servo pattern substantially continuously between detecting the first and second magnetic reference indicator marks.

7. The method of claim 1, wherein the magnetic data storage track has a centerline, and further wherein the magnetic reference indicator mark located along the magnetic data storage track is positioned relative to the centerline of the magnetic data storage track.

8. The method of claim 7, wherein the magnetic reference indicator mark is centered on the centerline of the magnetic data storage track.

9. The method of claim 1, wherein the magnetic head and the optical head are substantially fixed in position relative to each other.

10. The method of claim 1, wherein the magnetic data storage track is located on one major surface of the magnetic data storage tape and the optical servo pattern is located on an opposing major surface of the magnetic data storage tape.

11. The method of claim 1 further comprising monitoring a temperature of at least the head mechanism.

12. A magnetic data storage tape comprising:
   at least one magnetic data storage track extending along a length of the tape;
   at least one optical servo pattern distributed along the length of the tape; and
   at least one magnetic reference indicator mark located along the magnetic data storage track.

13. The tape of claim 12, wherein each of the magnetic data storage tracks has first and second ends, and further wherein at least one of the magnetic reference indicator marks is located proximate the first and second end of each of the magnetic data storage tracks.

14. The tape of claim 12, wherein each of the magnetic data storage tracks has first and second ends, and further wherein at least one of the magnetic reference indicator marks is located proximate the first and second end of each of the magnetic data storage tracks, and still further wherein at least one of the magnetic reference indicator marks is located between the first and second ends of each of the magnetic data storage tracks.

15. The tape of claim 12, wherein each of the optical servo patterns are distributed substantially continuously along the length of the tape.

16. The tape of claim 12, wherein each of the magnetic data storage tracks has a centerline, and further wherein the magnetic reference indicator marks located along each of the magnetic data storage tracks are positioned relative to the centerline of each of the magnetic data storage tracks.

17. The tape of claim 16, wherein the magnetic reference indicator marks are centered on the centerlines of the magnetic data storage tracks.

18. The tape of claim 12, wherein the magnetic data storage tracks are located on one major surface of the magnetic data storage tape and the optical servo patterns are located on an opposing major surface of the magnetic data storage tape.

19. The tape of claim 12 wherein the at least one magnetic reference indicator mark comprises a plurality of substantially repeating magnetic reference indicator marks.

20. An information handling system comprising:
   a tape drive having an optical servo system, the optical servo system comprising a head mechanism having a magnetic head and an optical head wherein the optical head is adapted to maintain the position of the magnetic head over a data track on a magnetic tape as the magnetic tape moves relative thereto and the magnetic head is adapted to calibrate the head mechanism by reading one or more magnetic reference indicator marks located along the tape; and
   an information processing device operatively coupled to the tape drive.

21. The system of claim 20 wherein the information processing device comprises a computer.

22. The system of claim 20 wherein the information processing device comprises a network of computers.

* * * * *